Jan. 7, 1958   J. B. RATELBAND   2,818,880
VALVES

Filed April 20, 1954   2 Sheets-Sheet 1

INVENTOR:
JOHANNES B. RATELBAND

ATTORNEY

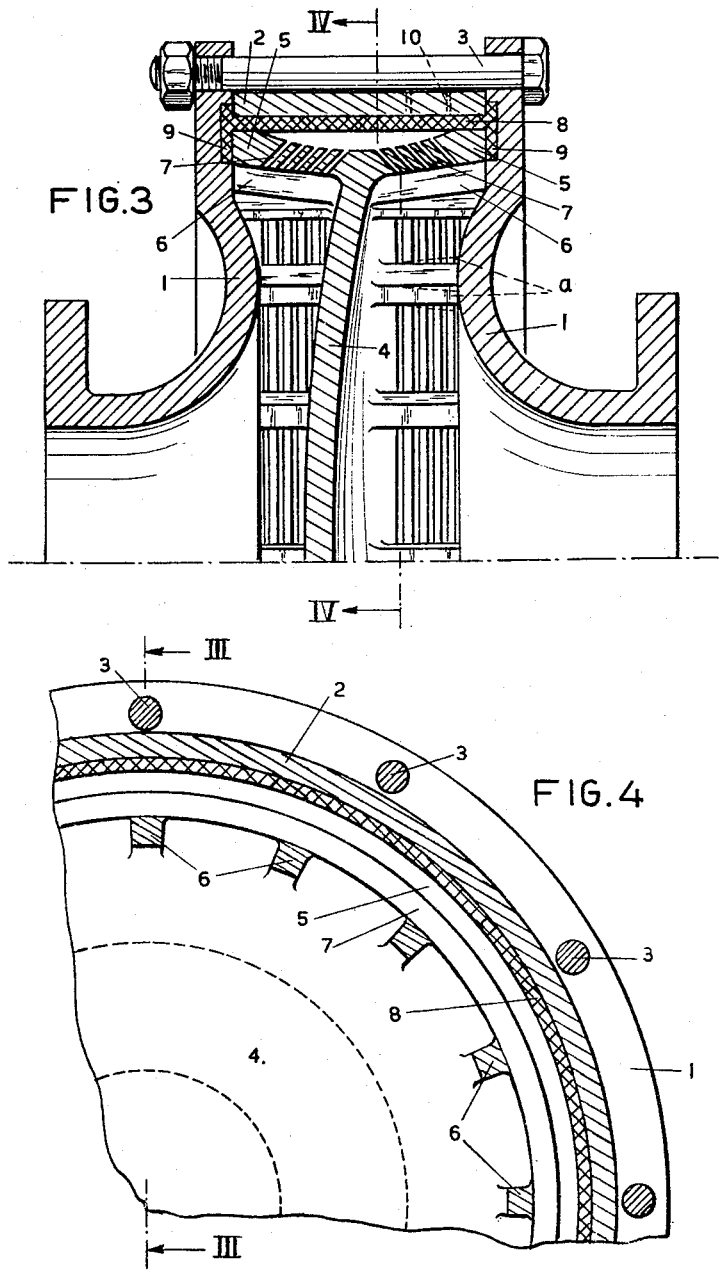

United States Patent Office 2,818,880
Patented Jan. 7, 1958

2,818,880

VALVES

Johannes B. Ratelband, Barendrecht, Netherlands

Application April 20, 1954, Serial No. 424,434

Claims priority, application Netherlands May 1, 1953

1 Claim. (Cl. 137—525)

The present invention relates to a valve, the housing of which is provided with a removable insert, forming a partition between the inflow side and the outflow side of the housing and having on either side of said partition an annular wall provided with flow passages and surrounded by a sleeve-like diaphragm on the outer side of which a chamber is formed to which pressure fluid may be supplied.

In the known valves of this kind the flow passages in the annular wall of the insert are formed by slots extending in longitudinal direction. Such an insert, however, requires much labour and is, therefore, relatively expensive.

It is one object of the present invention to design the insert of a valve of the kind referred to above in such a manner that the flow passages may easily be obtained by providing ribs on the inner surface of the annular wall of the insert on either side of the partition and distributed around the circumference of the insert, the flow passages being formed by annular grooves, extending on to the ribs. Said grooves may thus be obtained by turning off the material of the insert up to the ribs whereby slots are formed between the ribs.

With this and other objects in view which will become apparent in the following detailed description, the present invention will be clearly understood in connection with the accompanying drawings, in which:

Fig. 3 is half longitudinal section along the lines 3—3 of Fig. 4 of a valve according to the second embodiment; and Fig. 4 is a part of a cross section of said valve taken along the lines 4—4 in Fig. 3.

Figure 1:
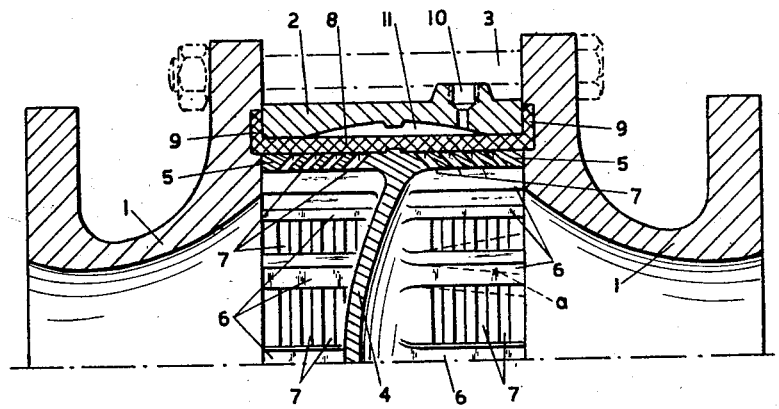
Figure 1 is half a longitudinal section of a valve according to the first embodiment in closed position.

Referring now to the drawing, the housing of the valve consists of two end pieces 1 and a cylindrical body 2 and said parts are clamped together by means of bolts 3 distributed along the circumference of the housing. The housing accommodates an insert forming a partition 4 between the inflow side and the outflow side of the housing and having an annular wall 5 on either side of said partition. At the inner side of said wall 5 longitudinal ribs 6 are provided. The wall 5 has grooves 7 obtained by turning off the material between the ribs 6 so that slots are formed between the ribs.

Bolts 3 also serve for clamping the diaphragm 8 which to this end is provided with flanges 9. Pressure fluid may be supplied to the outer side of the diaphragm through the opening 10 whereby the diaphragm is forced inwards on to the insert and closes the flow passages.

In order to reduce the flow resistance in the valve as far as possible both series of grooves 7 are inclined towards each other. The width of the ribs 6 may increase towards the ends of the insert in longitudinal direction as shown in Figs. 1 and 3 by dotted lines *a*, so that also the length of the slots formed between the ribs varies.

Figure 2:
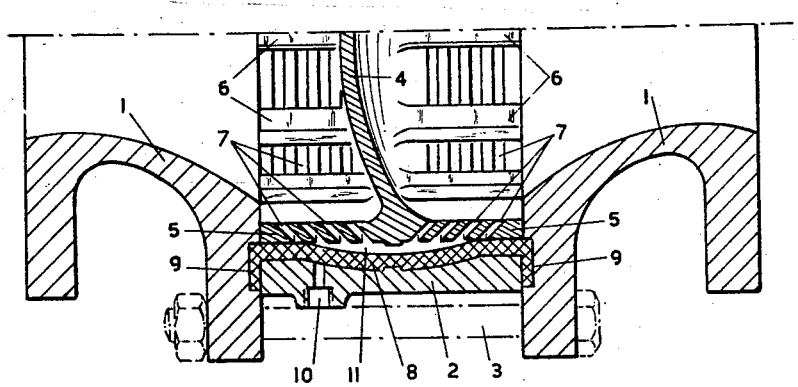
Fig. 2 is a similar section of said valve in open position.

With the embodiment shown in Figs. 1 and 2 the annular wall 5 of the insert is exactly cylindrical and the chamber 11 to which pressure fluid is supplied is formed in the intermediate part 2 of the housing.

With the embodiment shown in Figs. 3 and 4 the annular wall 5 of the insert is concavely curved and has its smallest diameter at the partition 4.

While I have disclosed two embodiments of the present invention, it is to be understood that these embodiments are given by example only and not in a limiting sense, the scope of the present invention being determined by the objects and the claim.

What I claim is:

A valve comprising a housing provided with a removable insert, the latter forming a partition between the inflow side and the outflow side of said housing and having on either side of said partition a circular wall provided with flow passages and surrounded by a sleeve-like diaphragm, the outer side of said diaphragm defining a chamber adapted to receive pressure fluid, a plurality of longitudinal ribs being provided on the inner surface of said circular wall of said insert on either side of said partition and distributed around the circumference of said insert, and said circular wall having a plurality of annular grooves disposed on both sides of said partition and extending to said ribs, thereby, forming slots between said ribs.

References Cited in the file of this patent

UNITED STATES PATENTS

| | | |
|---|---|---|
| 2,353,143 | Bryant | July 11, 1944 |
| 2,622,620 | Annin | Dec. 23, 1952 |
| 2,650,607 | Bryant | Sept. 1, 1953 |